US012103539B2

(12) United States Patent
Schumann et al.

(10) Patent No.: US 12,103,539 B2
(45) Date of Patent: Oct. 1, 2024

(54) SURFACE DETECTION VIA A DIRECTED AUTONOMOUS VEHICLE

(71) Applicants: Continental Automotive Systems, Inc., Auburn Hills, MI (US); Steering Solutions IP Holding Corporation, Auburn Hills, MI (US)

(72) Inventors: Clinton L. Schumann, Holly, MI (US); Scott T. Sanford, Swartz Creek, MI (US); Geoff Bauer, Oxford, MI (US); Joseph A. LaBarbera, Auburn Hills, MI (US)

(73) Assignee: Steering Solutions IP Holding Corporation, Auburn Hills, MI (US)

( * ) Notice: Subject to any disclaimer, the term of this patent is extended or adjusted under 35 U.S.C. 154(b) by 527 days.

(21) Appl. No.: 17/000,505

(22) Filed: Aug. 24, 2020

(65) Prior Publication Data
US 2022/0055629 A1    Feb. 24, 2022

(51) Int. Cl.
| B60W 40/068 | (2012.01) |
| B60W 10/04 | (2006.01) |
| B60W 10/18 | (2012.01) |
| B60W 10/20 | (2006.01) |
| B60W 60/00 | (2020.01) |

(Continued)

(52) U.S. Cl.
CPC ........ *B60W 40/068* (2013.01); *B60W 10/04* (2013.01); *B60W 10/18* (2013.01); *B60W 10/20* (2013.01); *B60W 60/0015* (2020.02); *G05D 1/0088* (2013.01); *G05D 1/106* (2019.05); *B60W 2556/65* (2020.02); *H04W 4/46* (2018.02)

(58) Field of Classification Search
None
See application file for complete search history.

(56) References Cited

U.S. PATENT DOCUMENTS

| 8,983,706 B2 | 3/2015 | Hartmann et al. |
| 9,174,641 B2 | 11/2015 | Fritz et al. |

(Continued)

FOREIGN PATENT DOCUMENTS

| DE | 102007007282 A1 | 9/2007 |
| DE | 102008047750 A1 | 5/2009 |

(Continued)

OTHER PUBLICATIONS

Gao et al., "Multi-sensor Fusion Road Friction Coefficient Estimation During Steering with Lyapunov Method", sensors, Sep. 4, 2019 (Year: 2019).*

(Continued)

Primary Examiner — Tamara L Weber
(74) Attorney, Agent, or Firm — Lorenz & Kopf LLP

(57) ABSTRACT

A number of illustrative variations may include the steps of providing a first vehicle including at least one sensor, a controller configured to process sensor data, and a vehicle communication system; providing a driving surface having an actual coefficient of friction; determining at least one estimated driving surface coefficient of friction; communicating the at least one estimated driving surface coefficient from the first vehicle to the vehicle communication system; and communicating the at least one estimated driving surface coefficient from the vehicle communication system to at least one other vehicle directly or indirectly.

20 Claims, 1 Drawing Sheet

(51) Int. Cl.
*G05D 1/00* (2006.01)
*H04W 4/46* (2018.01)

(56) References Cited

U.S. PATENT DOCUMENTS

| | | | |
|---|---|---|---|
| 10,046,743 | B2 | 8/2018 | Jonasson et al. |
| 10,046,749 | B2 | 8/2018 | Jonasson et al. |
| 10,147,002 | B2 | 12/2018 | Hartmann et al. |
| 10,275,662 | B1 * | 4/2019 | Askeland .................. G06T 7/73 |
| 2018/0244278 | A1 | 8/2018 | Shami et al. |
| 2018/0356819 | A1 * | 12/2018 | Mahabadi ............. B60W 30/08 |
| 2020/0223443 | A1 * | 7/2020 | Gonzalez Aguirre ...................... B60W 60/00182 |
| 2020/0262439 | A1 | 8/2020 | Wyciechowski et al. |
| 2020/0331443 | A1 * | 10/2020 | Falconer ............. B60W 10/184 |
| 2021/0197846 | A1 * | 7/2021 | Thakur ................. G01S 17/931 |
| 2022/0144257 | A1 * | 5/2022 | Maeda .................. B60W 10/20 |

FOREIGN PATENT DOCUMENTS

| | | |
|---|---|---|
| DE | 102009041566 A1 | 3/2011 |
| DE | 10208815 B4 | 5/2011 |
| DE | 102012215526 A1 | 12/2013 |
| DE | 10107454 B4 | 12/2015 |
| DE | 102015205673 A1 | 10/2016 |
| DE | 102016201937 A1 | 8/2017 |
| DE | 102016203545 A1 | 9/2017 |
| EP | 2013069 B1 | 10/2012 |
| EP | 2681085 B1 | 5/2017 |
| EP | 2734425 B1 | 3/2018 |
| WO | 2014094767 A1 | 6/2014 |

OTHER PUBLICATIONS

J. Borgeson, A Stalheim "Sensor Data Fusion for Road Friction Estimation, pp. 13-15" Chalmers University of Technology, Goteborg, Sweden 2010.

C.S. Ahn "Robust Estimation of Road Friction Coefficient for Vehicle Active Safety Systems, Chapter 5" The University of Michigan, Ann Arbor, 2011.

CN Office action dated Dec. 15, 2023 for CN application No. 202110975051.6.

CN Office action dated May 13, 2024 for CN application No. 202110975051.6.

* cited by examiner

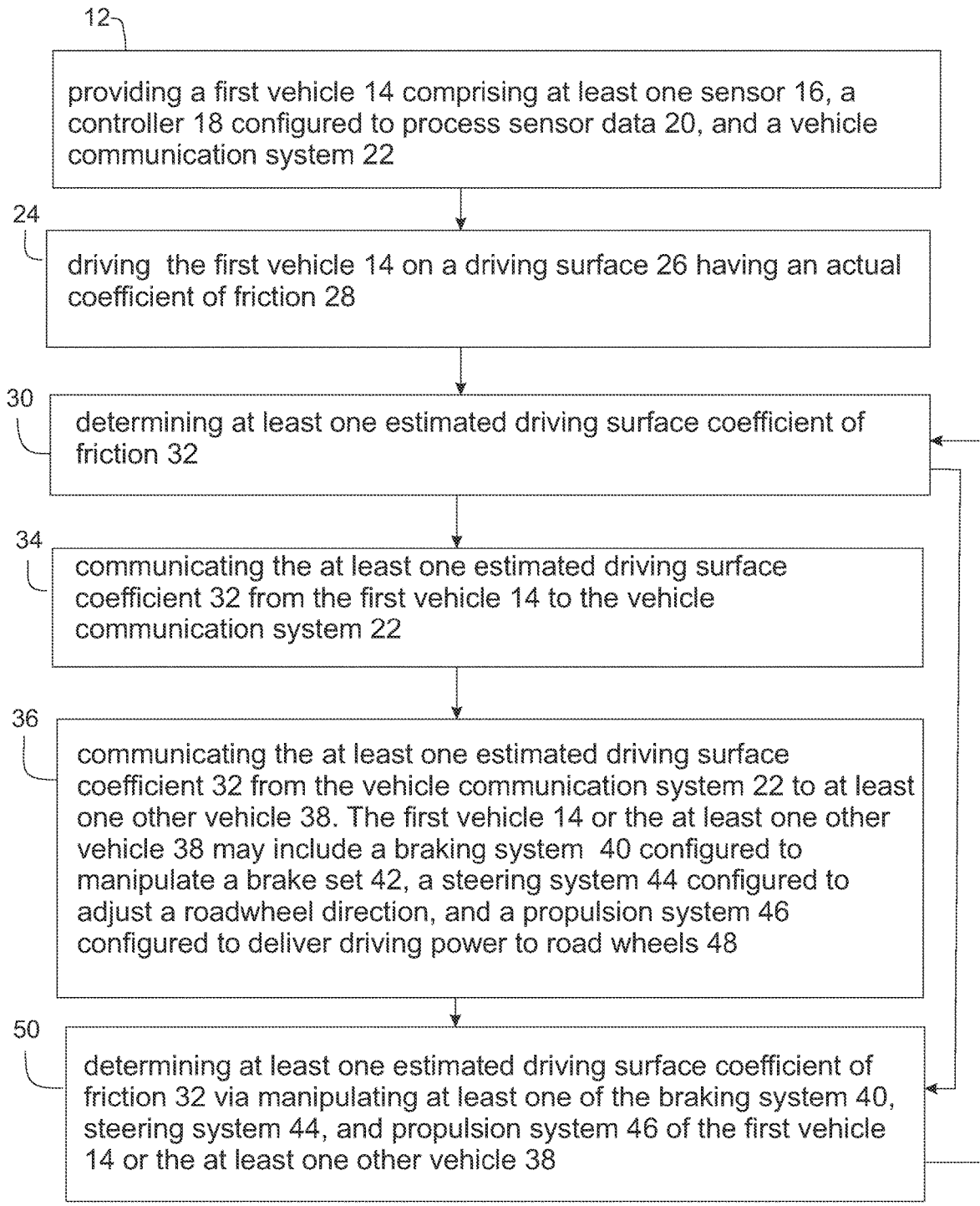

SURFACE DETECTION VIA A DIRECTED AUTONOMOUS VEHICLE

TECHNICAL FIELD

The field to which the disclosure generally relates to includes autonomous driving vehicles and accompanying systems.

BACKGROUND

Vehicles may include steering systems. Autonomous driving and steering systems typically associated with "self-driving vehicles" may include lane-keeping assist systems, lane centering systems, or traffic assist systems that may plan the trajectory of a vehicle based on data gathered from internal or external sources. The data may include vehicle speed and acceleration, climate conditions, nearby vehicle data, or the like which may be collected from a variety of sensors and environment models.

SUMMARY OF ILLUSTRATIVE VARIATIONS

A number of variations may include the steps of providing a first vehicle including at least one sensor, a controller configured to process sensor data, and a vehicle communication system; driving the first vehicle on a driving surface having an actual coefficient of friction; determining at least one estimated driving surface coefficient of friction; communicating the at least one estimated driving surface coefficient from the first vehicle to the vehicle communication system; and communicating the at least one estimated driving surface coefficient from the vehicle communication system to at least one other vehicle.

A number of variations may include providing an unmanned ground vehicle including at least one sensor, a controller configured to process sensor data, and a vehicle communication system; driving the first vehicle on a driving surface having an actual coefficient of friction; determining at least one estimated driving surface coefficient of friction via the at least one sensor; and communicating the at least one estimated driving surface coefficient from the unmanned ground vehicle to the vehicle communication system.

A number of variations may include providing an unmanned aerial vehicle including at least one sensor, a controller configured to process sensor data, and a vehicle communication system; flying the aerial vehicle within the at least one sensors detection range of a driving surface having an actual coefficient of friction; determining at least one estimated driving surface coefficient of friction via the at least one sensor; and communicating the at least one estimated driving surface coefficient from the unmanned aerial vehicle to the vehicle communication system.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 depicts an illustrative variation of a method including a vehicle equipped with hardware sufficient for carrying out at least some of the methods described herein.

DETAILED DESCRIPTION OF ILLUSTRATIVE VARIATIONS

The following description of the variations is merely illustrative in nature and is in no way intended to limit the scope of the invention, its application, or uses.

As used herein, "vehicle" may refer broadly to cargo or passenger vehicles, automobiles, buses, trucks, construction vehicles, off-road vehicles, or any vehicle having at least one wheel, aerial vehicles such as, but not limited to, drones, planes, and both manned and unmanned variations thereof.

As used herein, "operating environment" may refer broadly to roadways, highways, streets, paths, parking lots, parking structures, tunnels, bridges, traffic intersections, residential garages, or commercial garages. It is contemplated that the operating environment may include any location or space accessible by a vehicle.

In a number of illustrative variations, a vehicle may comprise a steering system. In such cases, the steering system may be manually operable by the driver via a steering interface, autonomously operable by as an autonomous steering system, or operable as a combination of autonomous and manual steering wherein the steering system is configured to receive and interpret steering input from a driver, the autonomous steering system, or both at the same time.

In a number of illustrative variations, a steering interface may comprise a hand wheel, a joystick, a trackball, a slider, a throttle, a pushbutton, a toggle switch, a lever, a touchscreen, a mouse, or any other known means of user input.

In a number of illustrative variations, a vehicle may comprise a steering system comprising a steering interface and a steerable propulsion system such as but not limited to a steering wheel and road wheels, respectively. The steering system may be of the electric power steering type wherein physical linkages mechanically communicate a manipulation of the steering interface to the steerable propulsion system. The steering system may be of the steer-by-wire type wherein physical mechanisms do not mechanically communicate a manipulation of the steering interface to the steerable propulsion system and wherein a manipulation of the steering interface affects an associated manipulation of the steerable propulsion system via the communication of electronic devices such as but not limited to sensors, transceivers and electronically excited actuators.

In a number of illustrative variations, a vehicle having road wheels may traverse any number of surfaces having any number of surface friction coefficients. While traversing these surfaces, it may be desirable for vehicle systems including but not limited to brake slip control systems, traction slip control systems, electronic brake force distribution systems, yaw torque control systems, and roll-over prevention systems to control the acceleration or braking of the road wheels individually or in groups according to the estimated or sensed driving surface conditions including but not limited to estimated or sensed surface friction coefficients. In such cases, such vehicle systems may be acting to ensure improved safety or control of the vehicle beyond that which would be possible in a vehicle lacking such systems.

In a number of illustrative variations, slip control systems such as but not limited to a traction control system (TCS) or electronic stability control (ESC) may be used to prevent a vehicle's wheels from spinning, due to a low surface friction coefficient, when torque is delivered to the wheels. Slip control systems may therefore be used to promote vehicle stability by selectively delivering power to the wheels based upon sensed slippage of the wheels, thus preventing unintended imbalances in driving force delivered from each wheel to the vehicle.

In a number of illustrative variations, slip control systems such as but not limited to anti-lock braking systems (ABS) to prevent a vehicle's wheels from locking, due to a low surface friction coefficient, when braking. Electronic Braking Distribution (EBD) may also be used to adjust the bias between the rear brakes and front brakes or left brakes and right brakes. Slip control systems may therefore be used to promote maintained steering control by selectively braking the wheels based upon sensed slippage of the wheels, thus preventing unintended imbalance in braking force delivered from each wheel to the vehicle.

In a number of illustrative variations, a steering system may comprise an autonomous slip control system. In such illustrative variations, the slip control system may be integrated into or communicate with the vehicle control systems of the autonomous steering system including but not limited to the propulsion systems including but not limited to engine control systems, braking control systems, vehicle suspension control systems, and vehicle steering systems.

In a number of illustrative variations, a vehicle may include at least one sensor constructed and arranged to sense, detect, or determine any number of surface friction coefficients as well as real-time environmental data and road surface conditions. The at least one sensor may include any number of sensors associated with autonomous driving systems, vehicles, automobiles, environmental data collection systems, or the like. The at least one sensor may include sensors associated with cargo or passenger vehicles such as park assist sensors, blind spot detection sensors, surround sensors, collision warning sensors, traffic sign or signal recognition sensors, emergency brake, pedestrian detection, collision avoidance sensors, or cross traffic sensors. The at least one sensor may include radar, lidar, cameras, global positions system (GPS), global navigation satellite systems (GNSS), environmental sensors, or the like. Actual and estimated surface friction coefficients as well as real-time environmental data and road surface conditions may be used to assist in autonomous driving and road condition assessment. In a number of illustrative variations, a sensor such as but not limited to an optical sensor may be used to determine whether a driving surface is reflective, and a determination of a diminished surface friction coefficient may thus be derived.

In a number of illustrative variations, a stereoscopic camera or a plurality of cameras may be used to create a depth map of a driving surface from which the roughness or smoothness of the road may be determined.

In a number of illustrative variations, a single camera may be used to strategically collect an image or images and quickly yet efficiently process the image or images and classify the image or images based upon the features found therein. Features classified in the collected image or images may be classified in view of data collected at a prior moment wherein such features where associated with a particular surface friction coefficient. Thus, vehicle travel path and speed may be correlated to the collected and analyzed image or images along with relevant temporal aspects of vehicle travel to estimate a surface friction coefficient for the surface that the wheel of the vehicle is traversing at any given moment.

In a number of illustrative variations, a vehicle may provide actual or estimated surface friction coefficients as well as real-time environmental data and road surface conditions to a vehicle communication system such as a cloud-based vehicle-to-vehicle ("V2V" or "V2C") communications network and to other vehicles. As used herein, "cloud" may generally refer to a computer server, a plurality of servers, data centers, or the like for aggregating, storing, or transferring data via the internet. Vehicle communication systems may include vehicle-to-vehicle, vehicle-to-cloud, vehicle-to-device, vehicle-to-pedestrian, or vehicle-to-network functionality. Vehicle communication systems may allow a plurality of vehicles to wirelessly exchange information about a number of factors that may affect autonomously driving vehicles such as speed, location, trajectory, climate conditions, and the like. Vehicle communication systems may allow vehicles to determine potential vehicle crash threats, unsafe climate conditions, emergency vehicle presence, or the like.

As a non-limiting example, a first vehicle including a vehicle communication system may drive on a road experiencing a rain, snow or other adverse weather conditions or other conditions such as debris, sand, gravel, or other material that may affect surface friction. The first vehicle may include sensors which may determine that adverse weather and adverse driving conditions exist including determining an estimated coefficient of friction of the road and this information may be communicated to a vehicle communication system. A second vehicle some distance away but which is traveling towards the first vehicle may receive the information regarding adverse weather and adverse driving conditions near the first vehicle. The second vehicle may include an autonomous driving system which may receive the information and may adjust accordingly for the oncoming adverse weather and adverse driving conditions including but not limited to, adjusting speed and acceleration, traction-control safety measures, or rerouting the second vehicle.

The quality and relevance of real-time environmental data and road surface conditions sent to a vehicle communication system may deteriorate over time if vehicles have not traveled on certain roadways or through certain geographic locations over a period of time. Low traffic or remote geographic locations may result in insufficient data for vehicle communication systems to provide relevant data to vehicles. In the absence of relevant real-time environmental data and road surface conditions, vehicles and autonomous driving systems may lack full functionality and may take unnecessary precautions such as assuming worst case scenarios with respect to speed, location, trajectory, climate conditions, and the like.

In a number of illustrative variations, a surrogate or substitute vehicle may be dispatched to roads or geographic locations lacking relevant real-time environmental data and road surface conditions. The substitute vehicle may be an unmanned autonomous driving vehicle such as an unmanned ground vehicle (UGV), unmanned aerial vehicle (UAV), drone, remote controlled vehicle, or manned or human piloted ground vehicle, aerial vehicle, or drone. It is contemplated that the substitute vehicle may include any number of vehicles and the examples provided herein shall not be considered limiting. The substitute vehicle may be constructed and arranged to gather real-time environmental data and road surface conditions including measuring or estimating a coefficient of friction between a road and road wheels via at least one sensor and communicate the real-time environmental data and road surface conditions to vehicle communication systems for the purpose of providing relevant real-time environmental data and road surface conditions to cargo or passenger vehicles. Further, the substitute vehicle may be constructed and arranged to gather real-time environmental data and road surface conditions via performing tire to road interaction maneuvers to measure data such as the coefficient of friction between a tire or tires and the road. Maneuvers may include varying or manipulating vehicle speed, acceleration, direction, or braking that would otherwise be considered unsafe if performed by a cargo or passenger vehicle. When a passenger that could be injured or cargo that could be damaged are not in the vehicle, maneuvers at the maximum capabilities of the vehicle or at a capacity that would otherwise result in injury to a passenger or damage to cargo can be performed to determine road surface conditions (e.g. surface coefficient of friction), characteristics, and properties. A scout vehicle or aerial vehicle (e.g., a drone) may periodically or continuously be sent to various location, including remote locations, to periodically determine road surface conditions (e.g. surface coefficient of friction), characteristics, and properties.

Referring now to FIG. 1, an illustrative variation of a method 10 may include steps of providing 12 a first vehicle 14 comprising at least one sensor 16, a controller 18 configured to process sensor data 20, and a vehicle communication system 22. The method may further include the steps of driving the first vehicle on 24 a driving surface 26 having an actual coefficient of friction 28; determining 30 at least one estimated driving surface coefficient of friction 32; communicating 34 the at least one estimated driving surface coefficient 32 from the first vehicle 14 to the vehicle communication system 22; and communicating 36 the at least one estimated driving surface coefficient 32 from the vehicle communication system 22 to at least one other vehicle 38. The first vehicle 14 or the at least one other vehicle 38 may include a braking system 40 configured to manipulate a brake set 42, a steering system 44 configured to adjust a roadwheel direction, and a propulsion system 46 configured to deliver driving power to road wheels 48. The method 10 may further include the step of determining 50 at least one estimated driving surface coefficient of friction 32 via manipulating at least one of the braking system 40, steering system 44, and propulsion system 46 of the first vehicle 14 or the at least one other vehicle 38. The driving coefficient of friction of the surface may be communicated directly from vehicle to vehicle or may be communicated indirectly, for example to command center or cloud service that may communicate driving coefficient of friction of the surface to a second vehicle at a time when the second vehicle is within a predetermined distance of time from reaching the road surface of which the at least one estimated driving surface coefficient of friction was determined.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

According to variation 1, a method may include the steps of providing a first vehicle including at least one sensor, a controller configured to process sensor data, and a vehicle communication system; driving the first vehicle on a driving surface having an actual coefficient of friction; determining at least one estimated driving surface coefficient of friction; communicating the at least one estimated driving surface coefficient from the first vehicle to the vehicle communication system; and communicating the at least one estimated driving surface coefficient from the vehicle communication system to at least one other vehicle.

Variation 2 may include the method as in variation 1, wherein the first vehicle further may include a braking system configured to manipulate a brake set, a steering system configured to adjust a roadwheel direction, and a propulsion system configured to deliver driving power to the road wheels; and wherein determining at least one estimated driving surface coefficient of friction may include manipulating the braking system, steering system, and propulsion system of the first vehicle.

Variation 3 may include the method in any of variations 1 through 2 wherein determining at least one estimated driving surface coefficient of friction may be accomplished via the at least one sensor.

Variation 4 may include the method in any of variations 1 through 3 wherein the vehicle communication system may be a cloud-based vehicle-to-vehicle communication system.

Variation 5 may include the method in any of variations 1 through 4 wherein the vehicle communication system may be a vehicle-to-everything communication system.

Variation 6 may include the method in any of variations 1 through 5 wherein the first vehicle may be an unmanned ground vehicle.

Variation 7 may include the method in any of variations 1 through 6 wherein the first vehicle may be an unmanned aerial vehicle.

Variation 8 may include the method in any of variations 1 through 7 and further may include using the at least one estimated driving surface coefficient of friction to manipulate a braking system, a steering system, and a propulsion system of the at least one other vehicle.

Variation 9 may include a method that may include providing an unmanned ground vehicle including at least one sensor, a controller configured to process sensor data, and a vehicle communication system; driving the first vehicle on a driving surface having an actual coefficient of friction; determining at least one estimated driving surface coefficient of friction via the at least one sensor; and communicating the at least one estimated driving surface coefficient from the unmanned ground vehicle to the vehicle communication system.

Variation 10 may include the method as in variation 9 and further may include communicating the at least one estimated driving surface coefficient from the vehicle communication system to at least one other vehicle.

Variation 11 may include the method in any of variations 9 through 10 wherein the at least one other vehicle includes a braking system configured to manipulate a brake set, a steering system configured to adjust a roadwheel direction, and a propulsion system configured to deliver driving power to the road wheels; and further including using the at least one estimated driving surface coefficient of friction to manipulate the braking system, steering system, and propulsion system of the other vehicle.

Variation 12 may include the method in any of variations 9 through 11 wherein the vehicle communication system may be a cloud-based vehicle-to-vehicle communication system.

Variation 13 may include the method in any of variations 9 through 12 wherein the vehicle communication system may be a vehicle-to-everything communication system Variation 14 may include the method in any of variations 9 through 13 wherein determining at least one estimated driving surface coefficient of friction via the at least one sensor additionally includes performing vehicle maneuvers including manipulating at least one of vehicle speed, acceleration, direction, or braking.

Variation 15 may include a method that may include providing an unmanned aerial vehicle including at least one sensor, a controller configured to process sensor data, and a vehicle communication system; determining at least one estimated driving surface coefficient of friction of a driving surface via the at least one sensor; and communicating the at least one estimated driving surface coefficient from the unmanned aerial vehicle to the vehicle communication system.

Variation 16 may include the method as in variation 15 and further may include communicating the at least one estimated driving surface coefficient from the vehicle communication system to at least one other vehicle.

Variation 17 may include the method in any of variations 14 through 16 wherein the at least one other vehicle includes a braking system configured to manipulate a brake set, a steering system configured to adjust a roadwheel direction, and a propulsion system configured to deliver driving power to the road wheels; and further including using the at least one estimated driving surface coefficient of friction to manipulate the braking system, steering system, and propulsion system of the at least one other vehicle.

Variation 18 may include the method in any of variations 14 through 17 wherein the vehicle communication system may be a cloud-based vehicle-to-vehicle communication system.

Variation 19 may include the method in any of variations 14 through 18 wherein the vehicle communication system may be a vehicle-to-everything communication system.

Variation 20 may include method as set forth in any of Variations 2-8 wherein the manipulating at least one of the braking system, steering system, or propulsion system of the first vehicle is performed at the maximum capability of the first vehicle.

Variation 21 may include method as set forth in any of Variations 2-8 wherein the manipulating at least one of the braking system, steering system, or propulsion system of the first vehicle is performed without a passenger in the vehicle at the a capability of the first vehicle that would otherwise result in injury to a passenger in the vehicle.

Variation 22 may include method as set forth in any of Variations 2-8 wherein the manipulating at least one of the braking system, steering system, or propulsion system of the first vehicle is performed without cargo in the vehicle at the a capability of the first vehicle that would otherwise result in damage to a cargo in the vehicle.

Variation 23 may include method as set forth in any of Variations 11-14 wherein the manipulating at least one of the braking system, steering system, or propulsion system of the first vehicle is performed at the maximum capability of the first vehicle.

Variation 24 may include method as set forth in any of Variations 11-14 wherein the manipulating at least one of the braking system, steering system, or propulsion system of the first vehicle is performed without a passenger in the vehicle at the a capability of the first vehicle that would otherwise result in injury to a passenger in the vehicle.

Variation 25 may include method as set forth in any of Variations 11-14 wherein the manipulating at least one of the braking system, steering system, or propulsion system of the first vehicle is performed without cargo in the vehicle at the a capability of the first vehicle that would otherwise result in damage to a cargo in the vehicle.

The above description of select variations within the scope of the invention is merely illustrative in nature and, thus, variations or variants thereof are not to be regarded as a departure from the spirit and scope of the invention.

What is claimed is:

1. A method comprising:
   determining an absence of real time estimated surface driving coefficient from a vehicle traveling on a road or location zone stored on at least one computer server, dispatching an unmanned surrogate vehicle to the road or location zone,
   the unmanned surrogate vehicle comprising at least one sensor, a controller configured to process sensor data, and a vehicle communication system;
   driving the unmanned surrogate vehicle on the road or location zone having a driving surface having an actual coefficient of friction;
   determining at least one estimated driving surface coefficient of friction for the road or location zone via the at least one sensor;
   wirelessly communicating the at least one estimated driving surface coefficient for the road or location zone from the unmanned surrogate vehicle communication system to at least one computer server, the at least one computer server storing the at least one estimated driving surface coefficient for the road or location zone, the at least one computer server constructed and arranged to wirelessly receive and store the at least one estimated driving surface coefficient, and to wirelessly communicate at least one estimated driving surface coefficient to at least one other vehicle, and wirelessly communicating the at least one estimated driving surface coefficient for the road or location zone from the at least one computer server to at least one other vehicle on the road or location zone.

2. A method as set forth in claim 1 wherein the unmanned surrogate vehicle further comprises a braking system configured to manipulate a brake set, a steering system configured to adjust a roadwheel direction, and a propulsion system configured to deliver driving power to a set of road wheels; and
   wherein determining at least one estimated driving surface coefficient of friction comprises manipulating at least one of the braking system, steering system, or propulsion system of the unmanned surrogate vehicle.

3. A method as set forth in claim 2 further comprising manipulating at least one of the braking system, steering system, or propulsion system of the unmanned surrogate vehicle at a maximum capability of the unmanned surrogate vehicle.

4. A method as set forth in claim 3 wherein the manipulating at least one of the braking system, steering system, or propulsion system of the vehicle is performed without a passenger in the vehicle at a capability of the unmanned surrogate vehicle that would otherwise result in injury to a passenger in the vehicle.

5. A method as set forth in claim 3 wherein the manipulating at least one of the braking system, steering system, or propulsion system of the unmanned surrogate vehicle is performed without cargo in the vehicle at a capability of the unmanned surrogate vehicle that would otherwise result in damage to a cargo in the vehicle.

6. A method as set forth in claim 1 wherein determining at least one estimated driving surface coefficient of friction via the at least one sensor additionally comprises performing unmanned ground vehicle maneuvers comprising manipulating at least one of vehicle speed, acceleration, direction, or braking.

7. A method as set forth in claim 1 wherein the vehicle communication system is a cloud-based vehicle-to-vehicle communication system.

8. A method as set forth in claim 1 wherein the vehicle communication system is a vehicle-to-everything communication system.

9. A method as set forth in claim 1, further comprising using the at least one estimated driving surface coefficient of friction to manipulate at least one of a braking system, a steering system, or a propulsion system of the at least one other vehicle.

10. A method comprising:
   determining an absence of real time estimated driving surface coefficient from a vehicle traveling on a road or location zone stored on at least one computer server, dispatching an unmanned ground vehicle to the road or location zone, the unmanned ground vehicle comprising at least one sensor, a controller configured to process sensor data, and a vehicle communication system;
      driving the unmanned ground vehicle on a driving surface having an actual coefficient of friction;
      determining at least one estimated driving surface coefficient of friction for the road or location zone via the at least one sensor; and
      wirelessly communicating the at least one estimated driving surface coefficient from the unmanned ground vehicle to the at least one computer server.

11. A method as set forth in claim 10 wherein the vehicle comprises a braking system configured to manipulate a brake set, a steering system configured to adjust a roadwheel direction, and a propulsion system configured to deliver driving power to the road wheels; and
   further comprising using the at least one estimated driving surface coefficient of friction to manipulate at least one of the braking system, steering system, and propulsion system of the other vehicle.

12. A method as set forth in claim 10 wherein the unmanned ground vehicle comprises a cloud-based vehicle-to-vehicle communication system.

13. A method as set forth in claim 10 wherein the vehicle communication system is a vehicle-to-everything communication system.

14. A method as set forth in claim 10 wherein determining at least one estimated driving surface coefficient of friction for the road or location zone via the at least one sensor additionally comprises performing unmanned ground vehicle maneuvers comprising manipulating at least one of vehicle speed, acceleration, direction, or braking.

15. A method as set forth in claim 10 further comprising manipulating at least one of a braking system, steering system, or propulsion system of the unmanned ground vehicle at a maximum capability of the unmanned ground vehicle.

16. A method as set forth in claim 15 wherein the manipulating at least one of the braking system, steering system, or propulsion system is performed without cargo in the unmanned ground vehicle.

17. A method as set forth in claim 10, further comprising communicating the at least one estimated driving surface coefficient from the unmanned ground vehicle communication system to at least one other vehicle.

18. A method comprising:
   determining an absence of real time estimated driving surface coefficient from a vehicle traveling on a road or location zone stored on at least one computer server, dispatching an unmanned vehicle to the road or location zone, the unmanned vehicle comprising at least one sensor, a controller configured to process sensor data, and a vehicle communication system;
   determining at least one estimated driving surface coefficient of friction of a driving surface via the at least one sensor; and
   wirelessly communicating the at least one estimated driving surface coefficient from the unmanned vehicle to at least one computer server, and wirelessly communicating the at least one estimated driving surface coefficient for the road or location zone from the at least one computer server to at least one other vehicle on the road or location zone.

19. A method comprising:
   in response to a determined absence of real time estimated driving surface coefficient from a vehicle traveling on a road or location zone stored on at least one computer server, dispatching an unmanned surrogate vehicle to the road or location zone,
   the unmanned surrogate vehicle comprising at least one sensor, a controller configured to process sensor data, and a vehicle communication system;
   driving the unmanned surrogate vehicle on the road or location zone having a driving surface having an actual coefficient of friction;
   determining at least one estimated driving surface coefficient of friction for the road or location zone via the at least one sensor;
   wirelessly communicating the at least one estimated driving surface coefficient for the road or location zone from the vehicle communication system to at least one computer server, the at least one computer server storing the at least one estimated driving surface coefficient for the road or location zone, at least one computer server constructed and arranged to wirelessly receive and store the estimated driving surface coefficient, and to wirelessly communicate store the stored estimated driving surface coefficient to at least one other vehicle, and wirelessly communicating the at least one estimated driving surface coefficient for the road or location zone from the at least one server to at least one other vehicle on the road or location zone.

20. A method comprising:
   determining an absence of real time estimated surface coefficient from a vehicle traveling on a road or location zone stored on at least one computer server, and in response to a determined absence of real time estimated surface coefficient from a vehicle traveling on a road or location zone stored on at least one computer server dispatching an unmanned surrogate vehicle to the road or location zone,
   the unmanned surrogate vehicle comprising at least one sensor, a controller configured to process sensor data, and a vehicle communication system;
   driving the unmanned surrogate vehicle on the road or location zone having a driving surface having an actual coefficient of friction;
   determining at least one estimated driving surface coefficient of friction for the road or location zone via the at least one sensor;
   wirelessly communicating the at least one estimated driving surface coefficient for the road or location zone from the vehicle communication system to at least one computer server, the at least one computer server storing the at least one estimated driving surface coefficient for the road or location zone, at least one computer server constructed and arranged to wirelessly receive and store the estimated driving surface coefficient, and to wirelessly communicate store the stored estimated driving surface coefficient to at least one other vehicle, and wirelessly communicating the at least one estimated driving surface coefficient for the road or location zone from the at least one server to at least one other vehicle on the road or location zone.

* * * * *